(12) United States Patent
Nate et al.

(10) Patent No.: US 7,821,233 B2
(45) Date of Patent: Oct. 26, 2010

(54) CHARGING CIRCUIT

(75) Inventors: Satoru Nate, Kyoto (JP); Isao Yamamoto, Kyoto (JP); Sachito Horiuchi, Kyoto (JP)

(73) Assignee: Rohm Co., Ltd. (JP)

( * ) Notice: Subject to any disclaimer, the term of this patent is extended or adjusted under 35 U.S.C. 154(b) by 760 days.

(21) Appl. No.: 11/801,305

(22) Filed: May 9, 2007

(65) Prior Publication Data

US 2007/0263420 A1  Nov. 15, 2007

(30) Foreign Application Priority Data

May 9, 2006 (JP) .............................. 2006-130453
May 9, 2006 (JP) .............................. 2006-130459

(51) Int. Cl.
*H02J 7/00* (2006.01)

(52) U.S. Cl. ........................ 320/134; 320/152; 320/157; 361/18; 361/100; 361/91.1

(58) Field of Classification Search ................. 320/134, 320/152, 157, 159
See application file for complete search history.

(56) References Cited

U.S. PATENT DOCUMENTS 5,847,544 A * 12/1998 Eguchi ........................ 320/136

| | | | | |
|---|---|---|---|---|
| 2004/0164711 A1* | 8/2004 | Hayashi | ........................ | 320/134 |
| 2005/0036246 A1* | 2/2005 | Nagata et al. | .................. | 361/18 |
| 2005/0168264 A1* | 8/2005 | Fukami | ........................ | 327/535 |

FOREIGN PATENT DOCUMENTS

| JP | 8-149702 A | 7/1996 |
|---|---|---|
| JP | 9-219935 | 8/1997 |

OTHER PUBLICATIONS

Notification of Reason(s) for Refusal for Patent Application No. 2006-130453 with English translation mailed Apr. 13, 2010.

* cited by examiner

*Primary Examiner*—Edward Tso
*Assistant Examiner*—Arun Williams
(74) *Attorney, Agent, or Firm*—Cantor Colburn LLP

(57) ABSTRACT

In a charging circuit charging a battery based on a power supply voltage from an external power supply, a charging transistor is provided on a path from the external power supply to the battery. A charging control circuit is integrated on a semiconductor substrate, and adjusts an ON state of the charging transistor to control a charging current supplied to the battery. The voltage adjusting circuit provided on an electric power supply path from the external power supply to a power supply terminal of the charging control circuit generates a necessary voltage drop. The current adjusting circuit adjusts the ON state of the charging transistor such that a voltage of the battery is brought close to a predetermined voltage value. The clamp circuit clamps a voltage at the power supply terminal of the charging control circuit below a predetermined clamp voltage.

19 Claims, 3 Drawing Sheets

CHARGING CIRCUIT

BACKGROUND OF THE INVENTION

1. Field of the Invention

The present invention relates to a charging circuit which charges a secondary battery based on an external power supply voltage, particularly to an overvoltage protection technique of the charging circuit. The present invention also relates to an overvoltage protection circuit which protects a circuit from an overvoltage.

2. Description of the Related Art

Recently, many electronic circuits such as CPU (Central Processing Unit) which performs digital signal processing, DSP (Digital Signal Processor), a liquid crystal panel, or other analog and digital circuits are mounted on various electronic equipments such as a portable phone, PDA (Personal Digital Assistant), and a notebook personal computer. In a battery-driven electronic equipment on which a battery is mounted as a power supply, each electronic circuit in the equipment is operated by a battery voltage from the battery.

In the case where the battery is a secondary battery such as a lithium-ion battery, a charging circuit is incorporated into the electronic equipment. The charging circuit receives a voltage supplied from an external AC adaptor or the like, and the charging circuit supplies a charging current to the battery. For example, Japanese patent Application Laid-Open No. 9-219935 discloses the related technique.

There is a breakdown voltage in a circuit element such as a resistor and a transistor, which constitutes the electronic circuit. When the voltage exceeding the breakdown voltage is applied, the electronic circuit cannot perform the normal function.

[Patent Document] Japanese patent Application Laid-Open No. 9-219935

(1) The voltage given to the charging circuit from the outside is not always kept constant. For example, sometimes the extremely high voltage is supplied from the AC adaptor incompatible with the electronic equipment or other power supply circuits. When the voltage supplied from the outside exceeds the breakdown voltage of the charging circuit, not only a charging operation is affected, but also reliability is possibly affected in the charging circuit, the battery, and the electronic equipment.

(2) Generally, because CPU and DSP are operated by the voltage which is stabilized by the power supply circuit incorporated into the electronic equipment, the unexpected overvoltage is rarely applied to CPU and DSP. On the other hand, the charging circuit which charges the battery receives the power supply voltage from the outside, and the charging circuit performs the circuit operation with the power supply voltage.

When a user uses the external power supply circuit which should normally be used, the unexpected overvoltage is never applied to the charging circuit. On the other hand, when the user uses an external power supply incompatible with the electronic equipment, the extremely high overvoltage exceeding the breakdown voltage is possibly applied to the charging apparatus.

SUMMARY OF THE INVENTION

The present invention is made in view of the above problem, a general purpose of the invention is to provide an overvoltage protection technique.

One embodiment according to the invention relates to a charging circuit which charges a battery based on a power supply voltage from an external power supply. The charging circuit includes a charging transistor which is provided on a charging path from the external power supply to the battery; a charging control circuit which adjusts an ON state of the charging transistor to control a charging current supplied to the battery; and a voltage adjusting circuit which generates a voltage drop, the voltage adjusting circuit being provided on an electric power supply path from the external power supply to a power supply terminal of the charging control circuit. The charging control circuit includes: a clamp circuit which clamps a voltage at the power supply terminal of the charging control circuit below a predetermined clamp voltage; and a current adjusting circuit which adjusts the ON state of the charging transistor such that a voltage of the battery is brought close to a predetermined voltage value.

According to the embodiment, the clamp voltage is set according to the breakdown voltage of the charging control circuit, and the clamp circuit is incorporated into the charging control circuit. Therefore, the voltage adjusting circuit generates the voltage drop even if the overvoltage is applied as the power supply voltage, so that the voltage exceeding the clamp voltage can be prevented from being applied to the power supply terminal.

According to anther embodiment of the invention, the voltage adjusting circuit may be a resistor. In this case, when one element which is of the voltage adjusting circuit is added to the outside of the charging control circuit, the overvoltage protection can be realized without enlarging a circuit scale.

According to anther embodiment of the invention, the voltage adjusting circuit may include a protection transistor which is provided on the electric power supply path from the external power supply to the power supply terminal of the charging control circuit; and a resistor which is provided between a terminal connected to the external power supply of the protection transistor and a control terminal of the protection transistor, and the clamp circuit clamps a voltage at the control terminal of the protection transistor below a predetermined threshold voltage, and thereby the voltage at the power supply terminal of the charging control circuit is clamped below the clamp voltage.

In this case, because almost the current passed from the external power supply to the power supply terminal flows through the protection transistor, power consumption at the resistor can be suppressed to a low level, and an inexpensive resistor element having the small rated electric power can be utilized.

According to anther embodiment of the invention, the protection transistor is an NPN type bipolar transistor in which an emitter of the protection transistor is connected to the power supply terminal side of the charging control circuit, a collector thereof is connected to the external power supply. And the resistor may be provided between the collector of the protection transistor and a base which is of the control terminal.

According to anther embodiment of the invention, the charging circuit may further include a capacitor which is provided between the control terminal of the protection transistor and a fixed voltage terminal. In this case, because the capacitor and the resistor constitute a time constant circuit, a rising speed of the voltage applied to the charging control circuit can be reduced to realize the safer circuit protection, even if the power supply voltage from the external power supply rises rapidly.

According to anther embodiment of the invention, the clamp circuit may cut off the charging current supplied to the battery from the external power supply in a state in which the voltage is clamped at the power supply terminal of the charging control circuit. In this case, in the overvoltage state, the safer circuit protection can be realized by stopping the charging function.

According to anther embodiment of the invention, the charging circuit may further include a charging stop switch which is provided on a charging current path from the external power supply to the battery. The clamp circuit turns off the charging stop switch in a state in which the voltage is clamped at the power supply terminal of the charging control circuit.

Still another embodiment of the invention relates to an electronic equipment. The electronic equipment includes a battery; and a charging circuit according to the any of the above embodiments of the invention which charges the battery based on a power supply voltage from an external power supply.

According to the embodiment of the invention, even if the power supply voltage from the external power supply is the overvoltage, the battery and the charging circuit can stably operated.

Still another embodiment of the invention relates to an overvoltage protection circuit which is incorporated into a semiconductor integrated circuit, clamps a power supply voltage supplied to a power supply terminal of the semiconductor integrated circuit below a predetermined clamp voltage. The overvoltage protection circuit includes a first clamp circuit and a first switch which are provided in series between the power supply terminal and a fixed voltage terminal of the semiconductor integrated circuit; a reference voltage source which generates a predetermined reference voltage; and a comparator which compares the reference voltage with a voltage corresponding to the power supply voltage supplied to the power supply terminal. The comparator turns on the first switch when the voltage corresponding to the power supply voltage is higher than the reference voltage. As used herein, "fixed voltage terminal" shall mean a terminal, such as a ground terminal, positive and negative power supply terminals, and a reference voltage terminal, in which a potential is fixed.

According to the embodiment of the invention, when the power supply voltage supplied to the power supply terminal exceeds the threshold voltage, the electric conduction is established in the path including the first switch and the first clamp circuit. As a result, the clamping is performed such that the power supply voltage becomes below the clamp voltage, and the overvoltage protection can be realized.

According to anther embodiment of the invention, the overvoltage protection circuit may further include a current-voltage conversion circuit which converts a current flowing through a path including the first clamp circuit and the first switch into a voltage. A part of a function of the semiconductor integrated circuit may be stopped when the converted voltage exceeds a predetermined threshold voltage.

In this case, the generation of malfunction or trouble caused by the operation in the overvoltage state can be prevented in a part of the function of the semiconductor integrated circuit.

The overvoltage protection circuit according to another embodiment may further include a second clamp circuit and a second switch which are provided in series on a path parallel to a path from the first switch to the fixed voltage terminal. The reference voltage source is configured to output a low-voltage detection signal which becomes a predetermined level in a state in which the predetermined reference voltage cannot be output because of the low power supply voltage supplied to the semiconductor integrated circuit, and the second switch may be turned on in a period during which the low-voltage detection signal is the predetermined level.

In this case, even if the overvoltage is applied before the reference voltage source is started up, the path including the second clamp circuit and the second switch becomes surely active, so that the voltage at the power supply terminal can be suitably clamped.

In the overvoltage protection circuit according to another embodiment, the first clamp circuit may include a diode. In this case, the clamp voltage can be adjusted according to the number of diodes.

According to another embodiment of the invention, the first switch may be a P-channel MOSFET (Metal Oxide Semiconductor Field Effect Transistor). Also, the comparator may output a low-level comparison signal to a gate of the P-channel MOSFET which is of the first switch when a voltage corresponding to the power supply voltage is higher than the reference voltage. In this case, the P-channel MOSFET can be turned on in the overvoltage state.

According to another embodiment of the invention, the first switch is a P-channel MOSFET, the second clamp circuit and the second switch are connected in series between the gate of the P-channel MOSFET and the ground terminal, and a pull-up resistor may be provided between the gate and a source of the P-channel MOSFET.

According to another embodiment of the invention, the current-voltage conversion circuit includes a first transistor which is provided in series with the first clamp circuit and the first switch; a second transistor which is connected to the first transistor in a current-mirror manner; and a resistor in which a potential at one end is fixed, and a current corresponding to a current flowing through the second transistor is flown through the resistor to convert the current into a voltage.

Still another embodiment of the invention relates to a charging apparatus which charges a battery based on a power supply voltage from an external power supply. The charging apparatus includes a charging transistor which is provided on a path from the external power supply to the battery; a charging control circuit which is integrated on a semiconductor substrate, and adjusts an ON state of the charging transistor to control a charging current supplied to the battery; and a voltage adjusting circuit which is provided on an electric power supply path from the external power supply to a power supply terminal of the charging control circuit and generates a voltage drop. The charging control circuit includes an overvoltage protection circuit according to any of the above embodiments which clamps a voltage at the power supply terminal of the charging control circuit below a predetermined clamp voltage; and a current adjusting circuit which adjusts the ON state of the charging transistor such that a voltage of the battery is brought close to a predetermined voltage value.

According to another embodiment of the invention, the voltage adjusting circuit may be a resistor.

According to another embodiment of the invention, the voltage adjusting circuit may include a protection transistor which is provided on the electric power supply path from the external power supply to the power supply terminal of the charging control circuit; and a resistor which is provided between a terminal connected to the external power supply of the protection transistor and a control terminal of the protection transistor. The overvoltage protection circuit may clamp a voltage at the control terminal of the protection transistor below a predetermined threshold voltage, and thereby the voltage at the power supply terminal of the charging control circuit is clamped below the clamp voltage.

The charging circuit according to another embodiment of the invention may further include a capacitor which is provided between the control terminal of the protection transistor and a fixed voltage terminal. In this case, an RC circuit is formed by the capacitor and the resistor connected to the control terminal of the protection transistor, so that the circuit protection can surely be realized even if the voltage supplied from the external power supply rises rapidly.

According to another embodiment of the invention, the overvoltage protection circuit may stop a charging function of the charging control circuit to cut off the charging current supplied from the external power supply to the battery in a state in which the voltage is clamped at the power supply terminal of the charging control circuit.

Still another embodiment of the invention relates to an electronic equipment. The electronic equipment includes a battery; and the above charging apparatus which charges the battery based on a power supply voltage from an external power supply.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DESCRIPTION OF THE PREFERRED EMBODIMENT

Figure 1:
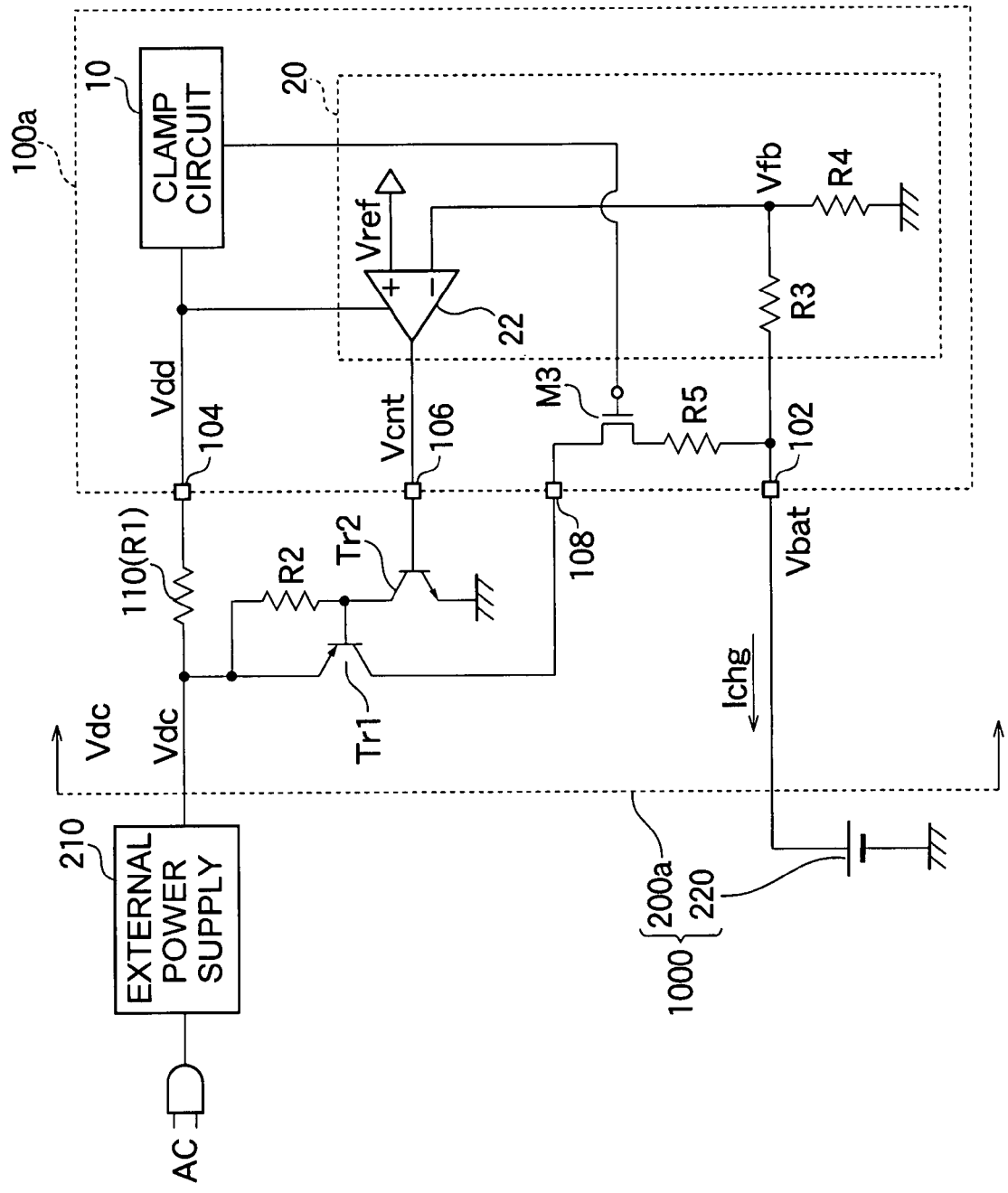
FIG. 1 is a circuit diagram showing an entire configuration of a charging circuit according to a first embodiment and an electronic equipment.

The invention will now be described based on preferred embodiments which do not intend to limit the scope of the present invention but exemplify the invention. All of the features and the combinations thereof described in the embodiment are not necessarily essential to the invention.

Charging circuits and clamp circuits according to preferred embodiments of the invention will be described below with reference to the accompanying drawings. In the drawings, the same or equivalent component, member, and process are designated by the same numerals, and the description is not repeated as appropriate. In the following description, it is assumed that the numerals attached to a voltage signal, a current signal, a resistance, and a capacitance are used to express a voltage value, current value, a resistance value, and a capacitance value if needed.

First Embodiment

FIG. 1 is a circuit diagram showing an entire configuration of a charging circuit 200a according to a first embodiment and an electronic equipment 1000.

The electronic equipment 1000 is a battery-driven portable information terminal such as a portable telephone terminal, PDA, and a notebook PC. The electronic equipment 1000 includes the charging circuit 200a and a battery 220. The electronic equipment 1000 also includes a power supply circuit (not shown), DSP, a liquid crystal panel, and other analog and digital circuits.

The battery 220 is a secondary battery such as a lithium-ion battery and a NiCd (nickel-cadmium) battery, and a battery voltage Vbat of the battery 220 is supplied to other circuit blocks of the electronic equipment 1000.

An external power supply 210 is an AC adaptor which converts a commercial alternating voltage into a DC (direct-current) voltage or a DC/DC converter which steps down a voltage of an in-vehicle battery. The external power supply 210 is connected to the electronic equipment 1000. The external power supply 210 supplies a DC power supply voltage Vdc to the charging circuit 200a.

The charging circuit 200a charges the battery 220 based on the DC power supply voltage Vdc from the external power supply 210. The charging circuit 200a includes a charging transistor Tr1, a charging control circuit 100a, a voltage adjusting circuit 110, and other circuit elements.

The charging transistor Tr1 is provided on a charging path from the external power supply 210 to the battery 220. In the embodiment, the charging path leads to the battery 220 through the charging transistor Tr1, a second current control terminal 108 of the charging control circuit 100a, and a battery terminal 102. The charging transistor Tr1 is a PNP type bipolar transistor, and an emitter of the charging transistor Tr1 is connected to the external power supply 210. A second resistor R2 is connected between the emitter and a base of the charging transistor Tr1. A charging control transistor Tr2 is connected between the base of the charging transistor Tr1 and a ground terminal which is of a fixed voltage terminal. The charging control transistor Tr2 is an NPN type bipolar transistor, a collector of the charging control transistor Tr2 is connected to the base of the charging transistor Tr1, and an emitter of the charging control transistor Tr2 is connected to the ground terminal.

The charging control circuit 100a is integrated on a semiconductor substrate, and the charging control circuit 100a adjusts an ON state of the charging transistor Tr1 to control a charging current Ichg supplied to the battery 220. The charging control circuit 100a includes a battery terminal 102, a power supply terminal 104, a first current control terminal 106, and a second current control terminal 108 which are of input and output terminals.

The battery 220 is connected to the battery terminal 102, and the collector of the charging transistor Tr1 is connected to the second current control terminal 108. A control voltage Vcnt is output from the first current control terminal 106 to control a degree of the ON state of the charging transistor Tr1. The control voltage Vcnt is input to the base of the charging control transistor Tr2. The power supply terminal 104 is used as a power supply terminal for the charging control circuit 100a, and a power supply voltage Vdd is supplied to the power supply terminal 104. In the following description, in order to avoid confusion of the description, if needed, the power supply voltage from the external power supply 210 is referred to as external power supply voltage Vdc, and the power supply voltage supplied to the first current control terminal 106 is referred to as internal power supply voltage Vdd.

In the embodiment, the voltage adjusting circuit 110 includes a voltage control resistor R1 which is provided on an electric power supply path from the external power supply 210 to the power supply terminal 104 of the charging control circuit 100a. A necessary voltage drop is generated in the voltage adjusting circuit 110 according to the operation, and the external power supply voltage Vdc is stepped down to the internal power supply voltage Vdd. For example, a resistance value of the voltage control resistor R1 is designed to be set to about 100Ω.

The charging control circuit 100a includes a clamp circuit 10, a current adjusting circuit 20, and other circuit elements. In the charging control circuit 100a, the internal circuits including the current adjusting circuit 20 are operated while the internal power supply voltage Vdd is used as the power supply.

For example, the charging control circuit 100a is configured to stably charge the battery 220 in the state in which the external power supply 210 supplies a voltage of about 5V as the external power supply voltage Vdc to the charging control circuit 100a. However, an originally-unexpected device is connected as the external power supply 210, and it is assumed that the external power supply voltage Vdc largely exceeds 5V, for example, it is assumed that the overvoltage of about 30V is applied. An overvoltage protection circuit is incorporated into the charging control circuit 100a to protect the circuit elements from the overvoltage.

The clamp circuit 10 functions as an overvoltage protection circuit which clamps the voltage Vdd of the power supply terminal 104 of the charging control circuit 100a below a predetermined clamp voltage Vclmp. The clamp voltage Vclmp may be set according to a breakdown voltage which is determined depending on a semiconductor manufacturing process of the charging control circuit 100a. Generally a high-breakdown voltage process has a disadvantage from the viewpoint of integration. Therefore, reliability is satisfied, and a process in which the breakdown voltage is decreased as much as possible is desirably selected. From this standpoint, desirably the breakdown voltage is set to a voltage value slightly higher than the external power supply voltage Vdc=5V which is expected in the usual operation. For example, the charging control circuit 100a may be designed by a 7V-breakdown voltage process which is higher than the external power supply voltage Vdc=5V by 2V. The clamp voltage Vclmp of the clamp circuit 10 can be set according to the breakdown voltage of the charging control circuit 100a. For example, the clamp voltage Vclmp is set to about 6.8V which is lower than 7V.

The current adjusting circuit 20 adjusts the ON state of the charging transistor Tr1 to control the charging current Ichg such that the voltage Vbat of the battery 220 is brought close to a predetermined voltage value. The current adjusting circuit 20 includes an error amplifier 22, a third resistor R3, and a fourth resistor R4. The third resistor R3 and the fourth resistor R4 divide the battery voltage Vbat emerging at the battery terminal 102, and output a feedback voltage Vfb given by Vbat×R4/(R3+R4) to an inverting input terminal of the error amplifier 22. A predetermined reference voltage Vref is applied to a non-inverting input terminal of the error amplifier 22. An output terminal of the error amplifier 22 is connected to the base of the charging control transistor Tr2 through the first current control terminal 106, and a charging control voltage Vcnt is output from the output terminal of the error amplifier 22. When the degree of the ON state of the charging control transistor Tr2 is controlled by the charging control voltage Vcnt, a collector current of the charging control transistor Tr2 is changed to change the voltage drop across the second resistor R2. As a result, the base-emitter voltage of the charging transistor Tr1 is changed to adjust the, degree of the ON state of the charging transistor Tr1.

A charging stop switch M3 and a fifth resistor R5 are provided in series between the second current control terminal 108 and battery terminal 102 of the charging control circuit 100a. The charging current Ichg flowing through the charging transistor Tr1 is supplied to the battery 220 through the charging stop switch M3 and fifth resistor R5.

In the embodiment, the clamp circuit 10 cuts off the charging current Ichg supplied to the battery 220 from the external power supply 210 in the state in which clamp circuit 10 clamps the internal power supply voltage Vdd of the power supply terminal 104 of the charging control circuit 100a, that is to say, in the state in which the external power supply voltage Vdc supplied from the external power supply 210 rises. Specifically, the charging current Ichg is cut off by turning off the charging stop switch M3 provided on a path of the charging current Ichg from the external power supply 210 to the battery 220.

The operation of the charging circuit 200a configured as above will be described below. When the external power supply 210 supplies the usual external power supply voltage Vdc of about 5V, the clamping function of the clamp circuit 10 does not work, but the charging control circuit 100a performs the usual charging function. The error amplifier 22 adjusts the base voltage of the charging transistor Tr1, that is to say, the ON state of the charging transistor Tr1 to appropriately supply the charging current Ichg to the battery 220 such that the inverting input terminal and non-inverting input terminal of the error amplifier 22 are equalized to each other in the voltage, namely, such that the relationship Vfb=Vref holds.

It is assumed that the overvoltage of about 30V is applied as the external power supply voltage Vdc from the external power supply 210. At this point, the internal power supply voltage Vdd of the power supply terminal 104 rises as the external power supply voltage Vdc rises. However, the clamp circuit 10 clamps the internal power supply voltage Vdd such that the internal power supply voltage Vdd does not rise to the clamp voltage Vclmp or more. The voltage drop appears across the voltage control resistor R1 which is of the voltage adjusting circuit 110. The voltage drop corresponds to a difference between the external power supply voltage Vdc=30V and the internal power supply voltage Vdd=Vclmp.

In accordance with the charging circuit 200a of the first embodiment, the clamp voltage Vclmp is set according to the breakdown voltage of the charging control circuit 10a, and the clamp circuit 10 is incorporated into the charging control circuit 100a. Therefore, even if the overvoltage is applied as the power supply voltage Vdc, the voltage drop is generated by the voltage adjusting circuit 110, so that the voltage exceeding the clamp voltage Vclmp can be prevented from being applied to the power supply terminal 104.

While the clamp circuit 10 clamps the internal power supply voltage Vdd, the clamp circuit 10 turns off the charging stop switch M3 to cut off the charging current Ichg. In the overvoltage state, the circuit protection can be realized more safely by stopping the charging function.

From the viewpoint of the circuit configuration, the clamp circuit 10 is incorporated into the charging control circuit 100a, and the charging circuit 200a can be realized only by adding the voltage control resistor R1. Therefore, the overvoltage protection can suitably realized without increasing the number of circuit components.

Second Embodiment

Figure 2:
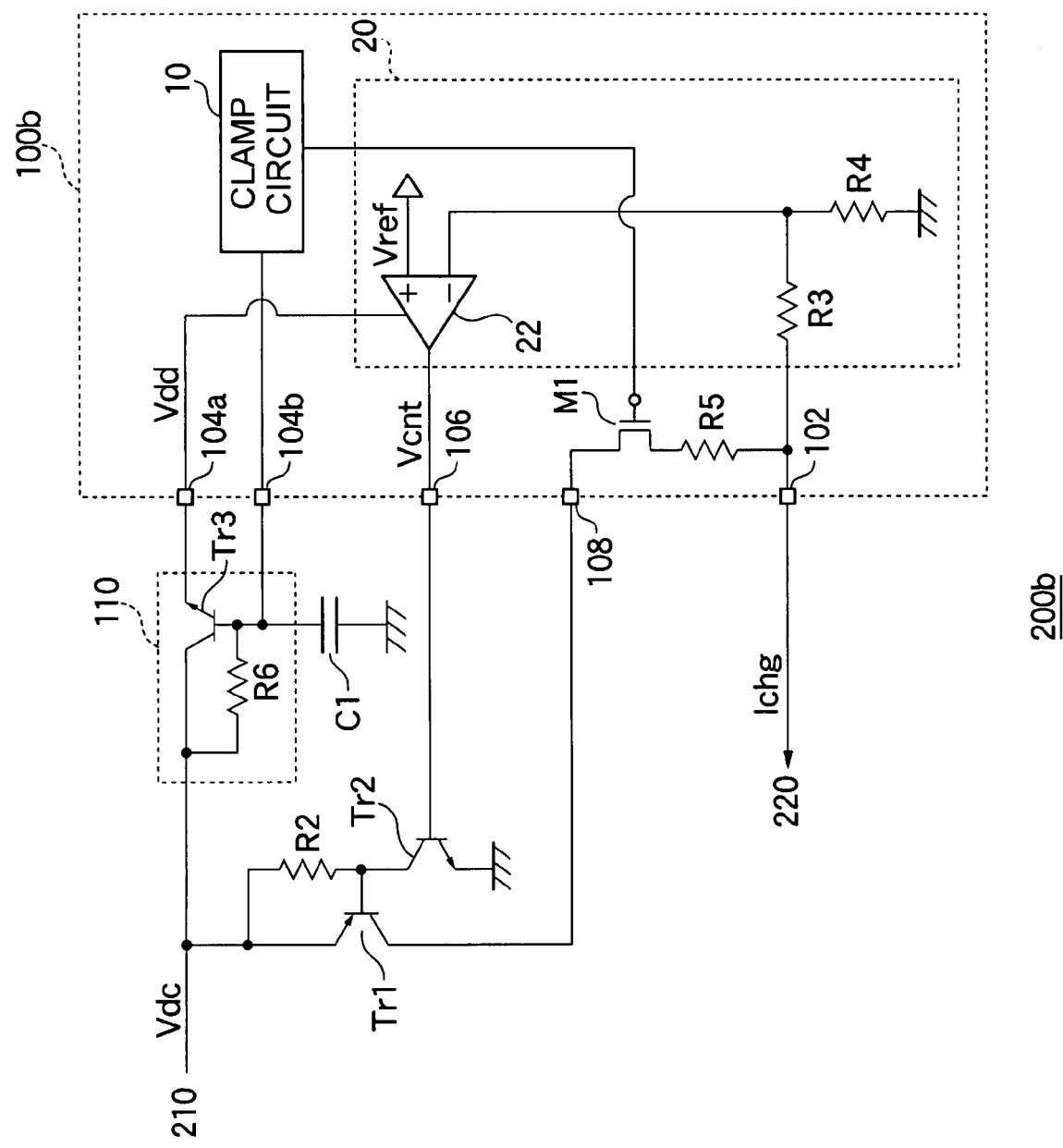
FIG. 2 is a circuit diagram showing a configuration of a charging circuit according to a second embodiment.

FIG. 2 is a circuit diagram showing a configuration of a charging circuit 200b according to a second embodiment. The difference between the second embodiment and the first embodiment will mainly be described.

In the charging circuit 200a of FIG. 1, a resistor element is used as the voltage adjusting circuit 110. Consequently, sometimes power consumption is increased at the voltage control resistor R1 in applying the overvoltage. For example, in the case of the external power supply voltage Vdc=30V and the clamp voltage Vclmp=7, the voltage drop of 23V is generated. When the resistance value is set to 100Ω, the power consumption of about $23^2/100 \approx 5$ W is generated. Accordingly, it is necessary that the element having the rated electric power of at least 5 W be selected as the voltage control resistor R1. From the viewpoints of size and cost of component, sometimes it is necessary to avoid the use of the resistor element having the large rated electric power. The charging circuit 200b of the second embodiment is effectively used in the case where the use of the resistor element having the large rated electric power is undesirable.

In the second embodiment, the voltage adjusting circuit 110 includes a protection transistor Tr3 and a sixth resistor R6. The protection transistor Tr3 is provided on an electric power supply path from the external power supply 210 to a power supply terminal 104a of the charging control circuit 100b. The protection transistor Tr3 is an NPN type bipolar transistor. The emitter of the protection transistor Tr3 is connected onto the side of the power supply terminal 104a of the charging control circuit 100b, and the collector thereof is connected onto the side of the external power supply 210. A sixth resistor R6 is provided between the base which is of the control terminal of the protection transistor Tr3 and the collector which is of the terminal connected to the external power supply 210 of the protection transistor Tr3.

The base of the protection transistor Tr3 is connected to a power supply terminal 104b of the charging control circuit 100b. In the second embodiment, the clamp circuit 10 clamps the base voltage of the protection transistor Tr3 below a predetermined threshold voltage Vth, which clamps the voltage Vdd of the power supply terminal 104a of the charging control circuit 100b below the clamp voltage Vclmp. In the second embodiment, Vclmp=Vth−Vf holds between the threshold voltage Vth and the clamp voltage Vclmp. Vf is a forward voltage of a diode located between the base and emitter of the protection transistor Tr3.

A capacitor C1 is provided between the base of the protection transistor Tr3 and the ground terminal.

The operation of the charging circuit 200b configured as above will be described below. When the overvoltage is applied as the external power supply voltage Vdc by the external power supply 210, the base voltage, that is to say, the voltage of the power supply terminal 104b rises as the collector voltage of the voltage adjusting circuit 110 rises. Because the clamp circuit 10 clamps the voltage of the power supply terminal 104b such that the voltage of the power supply terminal 104b does not exceed the threshold voltage Vth, the internal power supply voltage Vdd is clamped below Vclmp (=Vth−Vf).

At this point, the current flowing through the sixth resistor R6 becomes 1/hfe of the collector current of the protection transistor Tr3. hfe is a current amplification factor of the protection transistor Tr3. In the second embodiment, the current flowing through the sixth resistor R6 becomes extremely small compared with the current flowing through the voltage control resistor R1 of the first embodiment. As a result, the resistance value of the sixth resistor R6 can be set several ten times to a hundred times the resistance value of the voltage control resistor R1. At this point, in the overvoltage state, the electric power consumed at the sixth resistor R6 is decreased to one-several tenths to one-hundredth of the electric power consumed at the voltage control resistor R1 of the first embodiment.

As a result, the rated electric power of the sixth resistor R6 can be decreased to enhance a degree of freedom in circuit design.

In the charging circuit 200b of the second embodiment, the sixth resistor R6 and the capacitor C1 constitute a CR time constant circuit. Even if the external power supply voltage Vdc is rapidly increased, the increases in voltages are delayed at the power supply terminals 104a and 104b compared with the increase in external power supply voltage Vdc. Therefore, even if the clamp circuit 10 has a slow operation speed, the internal power supply voltage Vdd supplied to the charging control circuit 100b can surely be prevented from exceeding the clamp voltage.

Then, the configuration of the overvoltage protection which is utilized as the clamp circuit in the charging circuits 200a and 200b of the first and second embodiments will be described.

Figure 3:
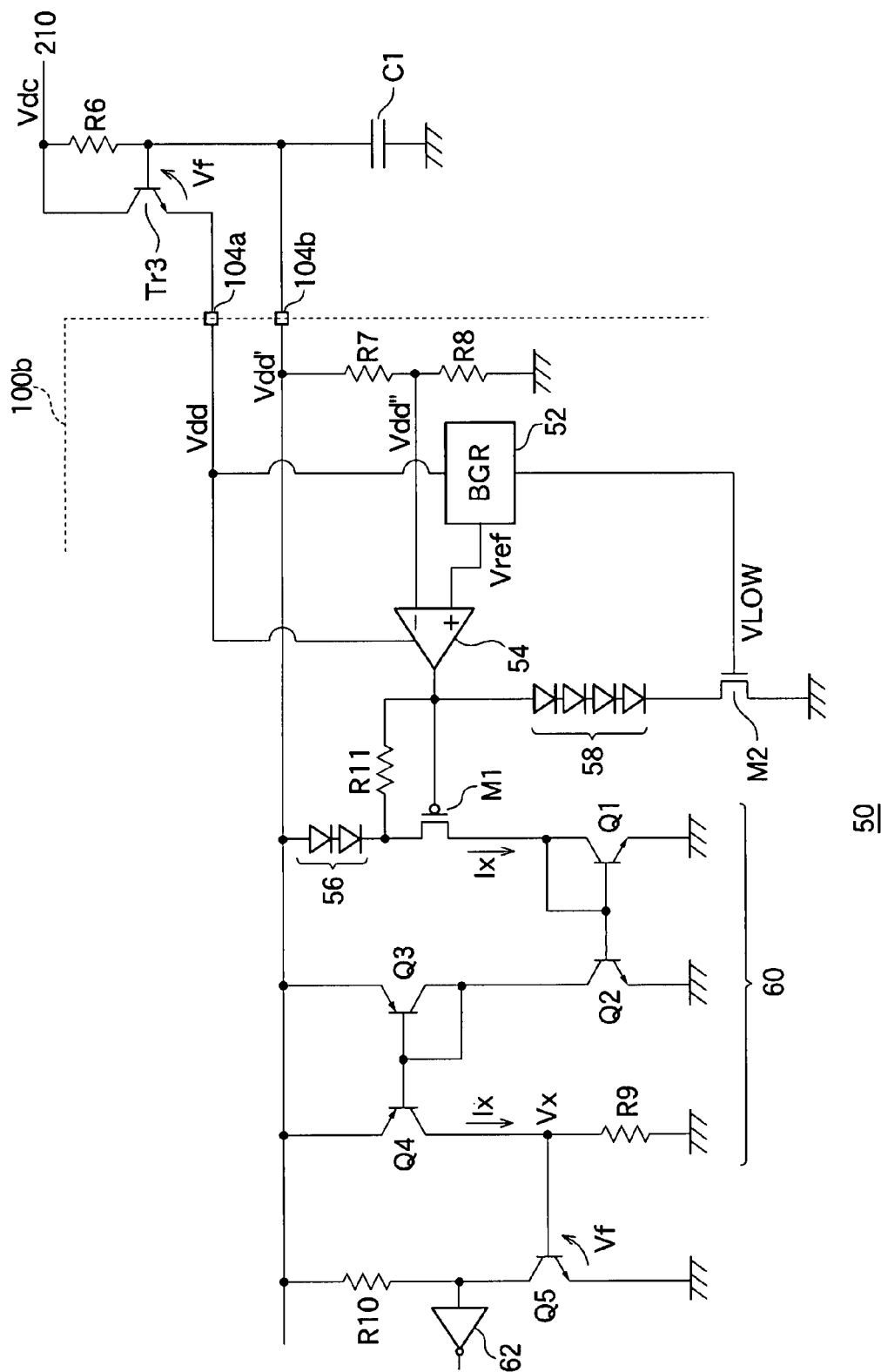
FIG. 3 is a circuit diagram showing a configuration of an overvoltage protection circuit which is used as a clamp circuit in the first and second embodiments.

FIG. 3 is a circuit diagram showing a configuration of an overvoltage protection circuit 50 which is used as the clamp circuit 10 in the first and second embodiments. The overvoltage protection circuit 50 is incorporated into a semiconductor integrated circuit. The overvoltage protection circuit 50 is a clamp circuit which clamps the power supply voltage Vdd supplied to the power supply terminal 104a of the semiconductor integrated circuit below a predetermined clamp voltage.

The overvoltage protection circuit 50 includes a reference voltage source 52, a comparator 54, a first clamp circuit 56, a second clamp circuit 58, a first switch M1, a second switch M2, and a current-voltage conversion circuit 60.

The first clamp circuit 56 and the first switch M1 are provided in series between the power supply terminal 104b of the charging control circuit 100b and the ground terminal. The first clamp circuit 56 includes plural diodes in which anodes are connected onto the side of the power supply terminal 104b and cathodes are connected onto the ground terminal side. The first switch M1 is a P-channel MOSFET whose source is connected to the first clamp circuit 56.

The reference voltage source 52 is a band gap regulator. The reference voltage source 52 generates a predetermined reference voltage Vref, and the reference voltage source 52 applies the reference voltage Vref to the non-inverting input terminal of the comparator 54. A seventh resistor R7 and an eighth resistor R8 divide the voltage Vdd' of the power supply terminal 104b to apply the divided voltage to the inverting input terminal of the comparator 54.

The comparator 54 compares the reference voltage Vref with a voltage Vdd" applied to the inverting input terminal. The voltage Vdd" corresponds to the power supply voltage Vdd' of the power supply terminal 104b. Then, the comparator 54 performs on and off control of the first switch M1 according to the comparison result. In the second embodiment, the comparator 54 outputs a comparison signal Vcmp which becomes a low level in the case of Vdd">Vref. The first switch M1 is turned on when the comparison signal Vcmp is the low level, and the first switch M1 is turned off when the comparison signal Vcmp is a high level.

The current-voltage conversion circuit 60 converts a current Ix into a voltage Vx. The current Ix flows through the path including the first clamp circuit 56 and the first switch M1. The current-voltage conversion circuit 60 stops a part of the function of the semiconductor integrated circuit when the converted voltage Vx exceeds the predetermined threshold voltage. The case where the charging function is stopped is described in the first and second embodiments.

The current-voltage conversion circuit 60 includes a first transistor Q1 to fourth transistor Q4 and a ninth resistor R9.

The first transistor Q1, the first clamp circuit 56, and the first switch M1 are provided in series on the same current path. The second to fourth transistors Q2 to Q4 are connected to the first transistor Q1 in a current-mirror manner. Currents Ix' copied by the second to fourth transistors Q2 to Q4 are flown through the ninth resistor R9 whose potential at one end is fixed, and a voltage of Vx=R9×Ix' is generated.

The voltage Vx is input to the base of the fifth transistor Q5 whose emitter is grounded. A tenth resistor R10 is provided between the collector of the fifth transistor Q5 and the power supply terminal 104b. When the voltage Vx exceeds the threshold voltage to turn on the fifth transistor Q5, an output of the inverter 62 becomes the high level. An output signal of the inverter 62 is utilized to stop a part of the function of the semiconductor integrated circuit. In the first and second embodiments, the output signal of the inverter 62 is utilized as the signal supplied to the gate of the charging stop switch M3.

The second clamp circuit 58 and the second switch M2 are connected in series, and are arranged on the path which is parallel to the path from the first switch M1 to the ground terminal. Specifically, the second clamp circuit 58 and the second switch M2 are connected in series between the gate of the first switch M1 and the ground terminal. A pull-up resistor R11 is provided between the gate and source of the first switch M1. The second switch M2 is an N-channel MOSFET, in which the source is grounded and the drain is connected to the second clamp circuit 58.

At this point, because the reference voltage source 52 is operated by the power supply voltage Vdd supplied to the power supply terminal 104a, sometimes the reference voltage source 52 cannot output the predetermined reference voltage Vref when the power supply voltage Vdd is low. In such cases, the reference voltage source 52 is configured to output a low-voltage detection signal VLOW which becomes the high level. The low-voltage detection signal VLOW is applied to the gate of the second switch M2. As a result, the second switch M2 is turned on while in a period during which the low-voltage detection signal VLOW is the high level, that is to say, the predetermined reference voltage Vref is not generated.

The operation of the overvoltage protection circuit 50 configured as above will be described below.

In the case where the power supply voltage Vdd applied to the power supply terminal 104a and the power supply voltage Vdd' applied to the power supply terminal 104b are the usual operation voltages, because Vdd"<Vref holds, the first switch M1 is turned off, the current does not flow through the path including the first clamp circuit 56 and the first switch M1, and the clamping function does not work.

In the overvoltage state, when the power supply voltage Vdd applied to the power supply terminal 104a and the power supply voltage Vdd' applied to the power supply terminal 104b rise, the comparison signal Vcmp output from the comparator 54 becomes the low level, and the first switch M1 is turned on. At this point, the current Ix flows through the path including the first switch M1 and the first clamp circuit 56, and the first clamp circuit 56 clamps the voltage Vdd' of the power supply terminal 104b below the predetermined threshold voltage Vth. The threshold voltage Vth is given by Vth≈Vf×2+VdsM1+VceQ1. Vf is a forward voltage of the diode of the first clamp circuit 56, VdsM1 is a drain-source voltage of the first switch M1, and VceQ1 is a collector-emitter voltage of the first transistor Q1.

When the voltage Vdd' of the power supply terminal 104b is clamped, the voltage Vdd of the power supply terminal 104a is clamped below the clamp voltage Vclmp=Vth−Vf. Vf is a base-emitter voltage of the protection transistor Tr3. As a result, the circuit protection is realized because the power supply voltage Vdd applied to the comparator 54 and reference voltage source 52 is suppressed below the clamp voltage.

At this point, the current-voltage conversion circuit 60 converts the current Ix into the voltage Vx. When Vx>Vf holds, the fifth transistor Q5 is turned on, and the output signal of the inverter 62 stops a part of the function of the semiconductor integrated circuit into which the overvoltage protection circuit 50 is incorporated.

In the embodiment, the circuit protection can preferably be realized even if the external power supply voltage Vdc supplied from the external power supply 210 rapidly rises from the neighborhood of 0V. When the external power supply voltage Vdc is around 0V, the reference voltage source 52 cannot generate the reference voltage Vref, and the comparator 54 cannot compare the voltages.

In this state of things, the reference voltage source 52 outputs the high-level low-voltage detection signal VLOW, the second switch M2 is turned on. Therefore, the path including the first clamp circuit 56, the pull-up resistor R11, the second clamp circuit 58, the second switch M2 becomes active to function as the clamp circuit. Accordingly, even if the external power supply voltage Vdc rises rapidly, the power supply voltage Vdd' of the power supply terminal 104b and the power supply voltage Vdd of the power supply terminal 104a can surely be clamped.

When the external power supply voltage Vdc rises to a certain extent to cause the reference voltage source 52 to generate the predetermined reference voltage Vref, the second switch M2 is turned off to transfer to the clamping operation on the path including the first clamp circuit 56 and the first switch M1.

Although the invention are described above based on the embodiments, obviously the embodiments show only the principle and application of the invention, and various modifications and changes in arrangement can be made without departing from the scope and spirit of the invention.

In the above embodiments, MOSFET and the bipolar transistor can be replaced with each other if needed. The N-channel MOSFET and the P-channel MOSFET can appropriately be replaced with each other, and the NPN type bipolar transistor and the PNP type bipolar transistor can appropriately be replaced with each other.

In the above embodiments, the charging transistor Tr1 and the charging control transistor Tr2 are provided outside the charging control circuit 100. However, the charging transistor Tr1 and the charging control transistor Tr2 may be provided inside the charging control circuit 100. Accordingly, which circuit element is formed inside the semiconductor integrated circuit can appropriately be changed according to the semiconductor process used and specifications required for the circuit.

In the above embodiments, the setting of the logical values of the high level and the low level is described by way of example, and the setting can freely be changed by appropriately inverting the logical values with the inverter.

While the preferred embodiments of the present invention have been described using specific terms, such description is for illustrative purposes only, and it is to be understood that changes and variations may be made without departing from the spirit or scope of the appended claims.

What is claimed is:

1. A charging circuit which charges a battery based on a power supply voltage from an external power supply, the charging circuit comprising:

a charging transistor which is provided on a charging path from the external power supply to the battery;
a charging control circuit which adjusts an ON state of the charging transistor to control a charging current supplied to the battery; and
a voltage adjusting circuit which is provided on an electric power supply path from the external power supply to a power supply terminal of the charging control circuit and generates a voltage drop, the voltage adjusting circuit, wherein
the charging control circuit comprises:
   a clamp circuit which clamps a voltage at the power supply terminal of the charging control circuit below a predetermined clamp voltage; and
   a current adjusting circuit which adjusts the ON state of the charging transistor such that a voltage of the battery is brought close to a predetermined voltage value, and wherein
the voltage adjusting circuit comprises:
   a protection transistor which is provided on the electric power supply path from the external power supply to the power supply terminal of the charging control circuit; and
   a resistor which is provided between a terminal connected to the external power supply of the protection transistor and a control terminal of the protection transistor, and
   the clamp circuit clamps a voltage at the control terminal of the protection transistor below a predetermined threshold voltage, and thereby the voltage at the power supply terminal of the charging control circuit is clamped below the clamp voltage.

2. The charging circuit according to claim 1, wherein the protection transistor is an NPN type bipolar transistor in which an emitter of the protection transistor is connected to the power supply terminal side of the charging control circuit, a collector is connected to the external power supply, and
the resistor is provided between the collector of the protection transistor and a base which is of the control terminal.

3. The charging circuit according to claim 1, further comprising a capacitor which is provided between the control terminal of the protection transistor and a fixed voltage terminal.

4. The charging circuit according to claim 1, wherein the clamp circuit cuts off the charging current supplied to the battery from the external power supply in a state in which the voltage is clamped at the power supply terminal of the charging control circuit.

5. The charging circuit according to claim 4, further comprising a charging stop switch which is provided on a charging current path from the external power supply to the battery, wherein
the clamp circuit turns off the charging stop switch in a state in which the voltage is clamped at the power supply terminal of the charging control circuit.

6. An electronic equipment comprising:
a battery; and
a charging circuit comprising:
   a charging transistor which is provided on a charging path from the external power supply to the battery;
   a charging control circuit which adjusts an ON state of the charging transistor to control a charging current supplied to the battery; and
   a voltage adjusting circuit which is provided on an electric power supply path from the external power supply to a power supply terminal of the charging control circuit and generates a voltage drop, the voltage adjusting circuit, wherein
the charging control circuit comprises:
   a clamp circuit which clamps a voltage at the power supply terminal of the charging control circuit below a predetermined clamp voltage; and
   a current adjusting circuit which adjusts the ON state of the charging transistor such that a voltage of the battery is brought close to a predetermined voltage value, and wherein
the voltage adjusting circuit comprises:
   a protection transistor which is provided on the electric power supply path from the external power supply to the power supply terminal of the charging control circuit; and
   a resistor which is provided between a terminal connected to the external power supply of the protection transistor and a control terminal of the protection transistor, and wherein
   the clamp circuit clamps a voltage at the control terminal of the protection transistor below a predetermined threshold voltage, and thereby the voltage at the power supply terminal of the charging control circuit is clamped below the clamp voltage;
wherein the charging circuit is structured to charge the battery based on a power supply voltage from an external power supply.

7. An overvoltage protection circuit which is incorporated into a semiconductor integrated circuit, clamps a power supply voltage supplied to a power supply terminal of the semiconductor integrated circuit below a predetermined clamp voltage, the overvoltage protection circuit comprising:
a first clamp circuit and a first switch which are provided in series between the power supply terminal and a fixed voltage terminal of the semiconductor integrated circuit;
a reference voltage source which generates a predetermined reference voltage; and
a comparator which compares the reference voltage with a voltage corresponding to the power supply voltage supplied to the power supply terminal, wherein
the comparator turns on the first switch when the voltage corresponding to the power supply voltage is higher than the reference voltage and wherein
the overvoltage protection circuit further comprises a second clamp circuit and a second switch which are provided in series on a path parallel to a path from the first switch to the fixed voltage terminal, wherein
the reference voltage source is configured to output a low-voltage detection signal which becomes a predetermined level in a state in which the predetermined reference voltage cannot be output because of the low power supply voltage supplied to the semiconductor integrated circuit, and
the second switch is turned on in a period during which the low-voltage detection signal is the predetermined level.

8. The overvoltage protection circuit according to claim 7, further comprising a current-voltage conversion circuit which converts a current flowing through a path including the first clamp circuit and the first switch into a voltage, wherein
a part of a function of the semiconductor integrated circuit is stopped when the converted voltage exceeds a predetermined threshold voltage.

9. The overvoltage protection circuit according to claim 7, wherein
the first clamp circuit comprises a diode.

10. The overvoltage protection circuit according to claim 7, wherein
the first switch is a P-channel MOSFET (Metal Oxide Semiconductor Field Effect Transistor).

11. The overvoltage protection circuit according to claim 10, wherein
the comparator outputs a low-level comparison signal to a gate of the P-channel MOSFET which is of the first switch when a voltage corresponding to the power supply voltage is higher than the reference voltage.

12. The overvoltage protection circuit according to claim 7, wherein
the first switch is a P-channel MOSFET,
the second clamp circuit and the second switch are connected in series between the gate of the P-channel MOSFET and the ground terminal, and
a pull-up resistor is provided between the gate and a source of the P-channel MOSFET.

13. The overvoltage protection circuit according to claim 7, wherein
the current-voltage conversion circuit comprises:
a first transistor which is provided in series with the first clamp circuit and the first switch;
a second transistor which is connected to the first transistor in a current-mirror manner; and
a resistor in which a potential at one end is fixed, and
a current corresponding to a current flowing through the second transistor is flown through the resistor to convert the current into a voltage.

14. A charging circuit which charges a battery based on a power supply voltage from an external power supply, the charging circuit comprising:
a charging transistor which is provided on a path from the external power supply to the battery;
a charging control circuit which is integrated on a semiconductor substrate, and adjusts an ON state of the charging transistor to control a charging current supplied to the battery; and
a voltage adjusting circuit which is provided on an electric power supply path from the external power supply to a power supply terminal of the charging control circuit and generates a voltage drop, wherein
the charging control circuit comprises:
an overvoltage protection circuit that is structured to clamp a voltage at the power supply terminal of the charging control circuit below a predetermined clamp voltage, the overvoltage protection circuit comprising:
a first clamp circuit and a first switch which are provided in series between the power supply terminal and a fixed voltage terminal of the semiconductor integrated circuit;
a reference voltage source which generates a predetermined reference voltage; and
a comparator which compares the reference voltage with a voltage corresponding to the power supply voltage supplied to the power supply terminal, wherein
the comparator turns on the first switch when the voltage corresponding to the power supply voltage is higher than the reference voltage; and
a current adjusting circuit which adjusts the ON state of the charging transistor such that a voltage of the battery is brought close to a predetermined voltage value, and wherein
the overvoltage protection circuit further comprises a second clamp circuit and a second switch which are provided in series on a path parallel to a path from the first switch to the fixed voltage terminal, wherein
the reference voltage source is configured to output a low-voltage detection signal which becomes a predetermined level in a state in which the predetermined reference voltage cannot be output because of the low power supply voltage supplied to the semiconductor integrated circuit, and
the second switch is turned on in a period during which the low-voltage detection final is the predetermined level.

15. The charging apparatus according to claim 14, wherein the voltage adjusting circuit is a resistor.

16. The charging apparatus according to claim 14, wherein the voltage adjusting circuit comprises:
a protection transistor which is provided on the electric power supply path from the external power supply to the power supply terminal of the charging control circuit; and
a resistor which is provided between a terminal connected to the external power supply of the protection transistor and a control terminal of the protection transistor, and
the overvoltage protection circuit clamps a voltage at the control terminal of the protection transistor below a predetermined threshold voltage, and thereby the voltage at the power supply terminal of the charging control circuit is clamped below the clamp voltage.

17. The charging apparatus according to claim 16, further comprising a capacitor which is provided between the control terminal of the protection transistor and a fixed voltage terminal 18. The charging apparatus according to claim 16, wherein the overvoltage protection circuit stops a charging function of the charging control circuit to cut off the charging current supplied from the external power supply to the battery in a state in which the voltage is clamped at the power supply terminal of the charging control circuit.

19. An electronic equipment comprising:
a battery; and
a charging apparatus that is structured to charge the battery based on a power supply voltage from an external power supply, the charging apparatus comprising:
a charging transistor which is provided on a path from the external power supply to the battery;
a charging control circuit which is integrated on a semiconductor substrate, and adjusts an ON state of the charging transistor to control a charging current supplied to the battery; and
a voltage adjusting circuit which is provided on an electric power supply path from the external power supply to a power supply terminal of the charging control circuit and generates a voltage drop, wherein the charging control circuit comprises:
an overvoltage protection circuit that is structured to clamp a voltage at the power supply terminal of the charging control circuit below a predetermined clamp voltage, the overvoltage protection circuit comprising:
a first clamp circuit and a first switch which are provided in series between the power supply terminal and a fixed voltage terminal of the semiconductor integrated circuit;
a reference voltage source which generates a predetermined reference voltage; and
a comparator which compares the reference voltage with a voltage corresponding to the power supply voltage supplied to the power supply terminal, wherein the comparator turns on the first switch when the voltage corresponding to the power supply voltage is higher than the reference voltage; and a current adjusting circuit which adjusts the ON state of the charging transistor such that a voltage of the battery is brought close to a predetermined voltage value, and wherein the overvoltage protection circuit further comprises a second clamp circuit and a second switch which are provided in series on a path parallel to a path from the first switch to the fixed voltage terminal, wherein the reference voltage source is configured to output a low-voltage detection signal which becomes a predetermined level in a state in which the predetermined reference voltage cannot be output because of the low power supply voltage supplied to the semiconductor integrated circuit, and the second switch is turned on in a period during which the low-voltage detection signal is the predetermined level.

* * * * *